B. N. BOTTS.
DISK PLOW.
APPLICATION FILED JAN. 30, 1911.
1,001,807.
Patented Aug. 29, 1911.
2 SHEETS—SHEET 2.
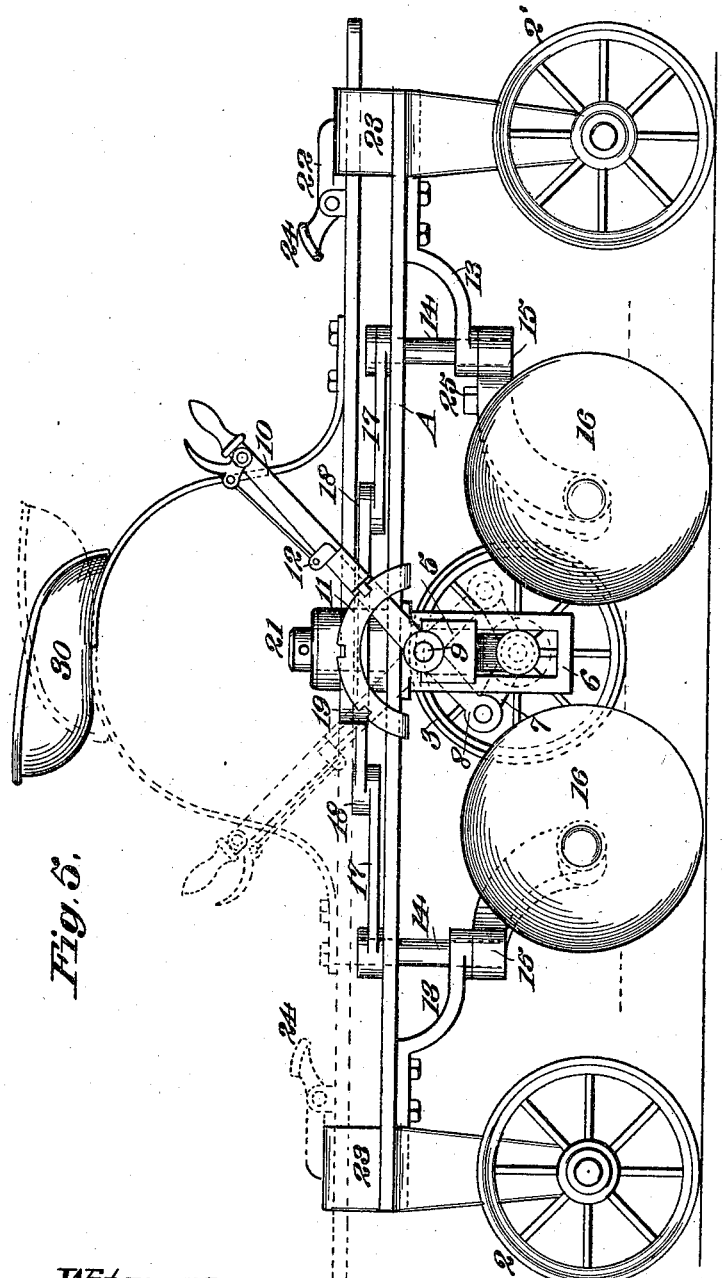
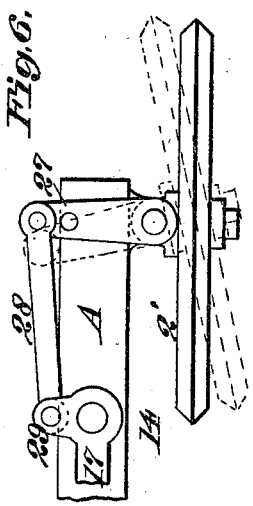
Witnesses,
Charles Pickles
Inventor:
Barnet N. Botts
By Geo. H. Strong
Atty

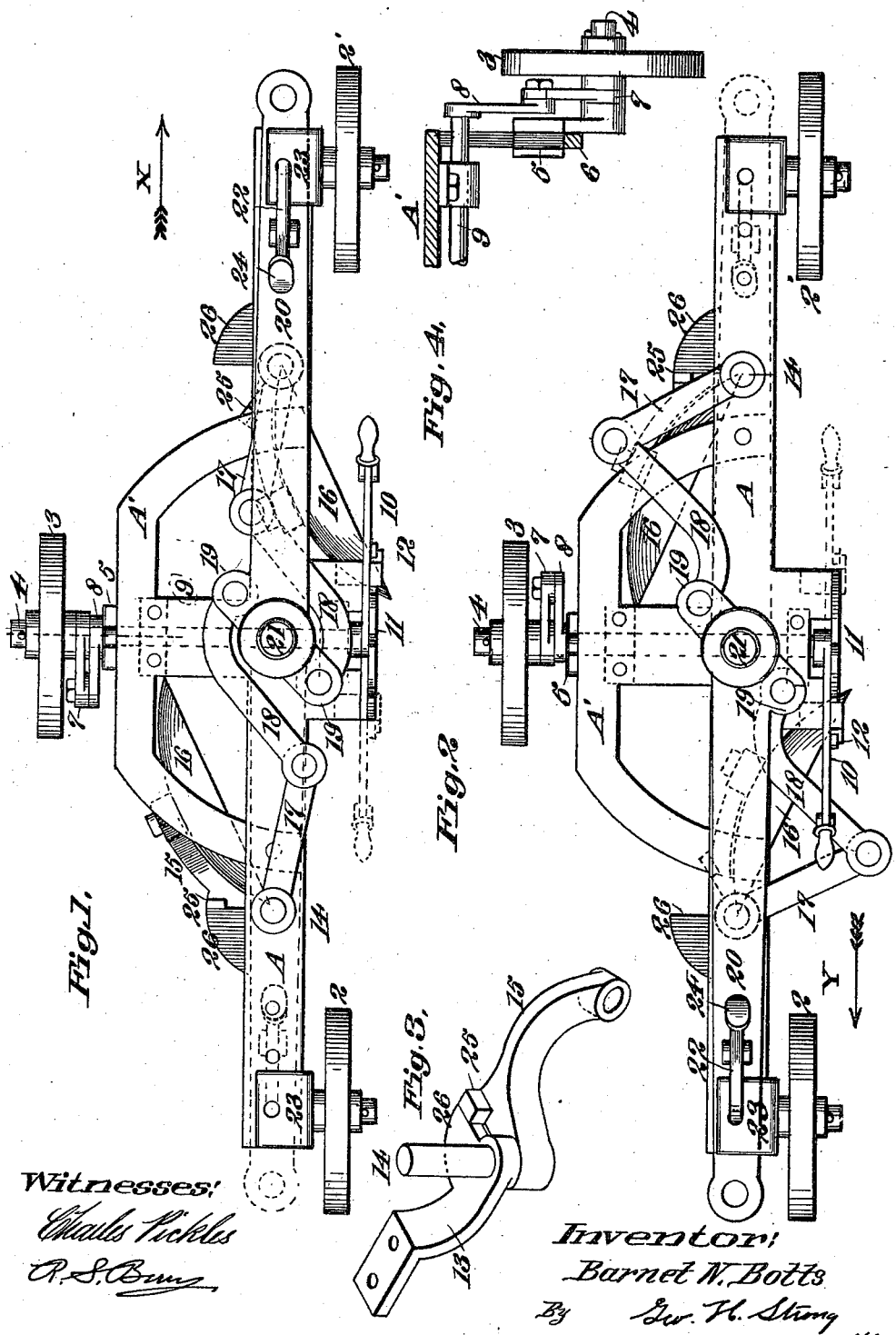

UNITED STATES PATENT OFFICE.

BARNET NIXON BOTTS, OF PASO ROBLES, CALIFORNIA, ASSIGNOR OF ONE-HALF TO VERNE EXLINE, OF PASO ROBLES, CALIFORNIA.

DISK PLOW.

1,001,807.          Specification of Letters Patent.          Patented Aug. 29, 1911.

Application filed January 30, 1911. Serial No. 605,443.

*To all whom it may concern:*

Be it known that I, BARNET N. BOTTS, citizen of the United States, residing at Paso Robles, in the county of San Luis Obispo and State of California, have invented new and useful Improvements in Disk Plows, of which the following is a specification.

This invention relates to a disk plow and particularly pertains to a disk plow in which the disks are reversible.

It is the object of this invention to provide a disk plow in which the disks are adapted to operate on a hillside or on level ground, and which is so constructed that it will perform the plowing functions when traveling in a forward or reverse direction.

A further object is to provide a disk plow in which the angle of the disks in relation to the line of draft may be reversed so that the direction of travel of the plow may be reversed without turning the plow carriage and yet obtain the same plowing efficiency.

Another object is to provide a novel means for reversing the disks which is simple in construction, substantial, and positive in its operation, and means by which the disks may be lifted clear of the ground, means being also provided for retaining the disks in their uppermost positions, so as to render them inoperative when it is desired to move the plow from one point to another without plowing.

The invention consists of the parts and the combination and construction of parts as hereinafter more fully described and claimed, having reference to the accompanying drawings, in which—

Figure 1 is a plan view of the plow as positioned to travel in one direction. Fig. 2 is a similar view showing the plow as reversed. Fig. 3 is a detail in perspective of the disk carrying arm. Fig. 4 is a detail vertical section on the line X X, Fig. 1. Fig. 5 is a side elevation. Fig. 6 is a detail plan view illustrating a modified form of mounting the furrow wheels.

In the drawings, A represents the draft beam or truck which may be formed of a rectangular bar or a channel iron, the outer ends of which are supported upon alined wheels 2—2'. A laterally extending segmental frame A' mounted on the beam A forms a bracket on which is mounted a vertically adjustable outrunner or wheel 3, which is so disposed as to ride on the unplowed ground adjacent a furrow. This wheel 3 is revoluble on a stud 4 formed on a hanger depending from a block or cross head 5 which is slidable on a guide hanger 6, rigidly secured to and depending from the underside of the bracket A'.

A link 7 is pivoted at one end on the stud 4 and has its opposite end pivotally connected to the lower end of an arm 8 mounted on the end of a rock shaft 9 which extends beneath the bracket A' and beam A, and is supported in suitable bearings thereon. The outer end of the shaft 9 is provided with an upwardly extending lever arm 10 having a handhold on its upper end by means of which the lever may be swung from side to side so as to rock the shaft 9 and thereby raise and lower the block 5 through the linked connection 7. A notched segment 11 is mounted on the beam A adjacent the lever arm 10, the notches of which are adapted to be engaged by a pawl 12 on the lever 10 to retain the latter in a fixed position in the manner common to machines of this character; the pawl 12 being released from the notched segment 11 when it is desired to operate the lever 10. When the lever 10 is in its extreme position on either side of the center of the segment 11, the block 5 and the wheel 3 thereon, are in their uppermost position, and when the lever 10 is vertically disposed in line with the center of the segment 11, the block 5 and the wheel 3 will be in their lowermost position. In the latter case the beam or truck A will be disposed in approximately a horizontal position if the wheels 2—2'—3 are on a level surface.

Mounted near the ends of the beam A are downwardly curved hangers 13. The ends of these hangers 13 extend horizontally toward the center of the beam and form bearings for vertically disposed rotatable studs 14 rigidly mounted at their lower ends on curved arms 15, as shown in Fig. 3, which are adapted to be swung from side to side on the hangers 13, as later described.

The outer end of each arm 15 carries a dished disk 16 which is vertically disposed and revolubly mounted at its center on the arm 15, the disk 16 being arranged to face in corresponding directions with one disk located to the rear and to one side of the other, as shown in Fig. 1; the faces of the disks being adapted to be swung into angular relation with the beam A by the operation of the stud 14.

The upper end of each stud 14 extends through the beam A and has a horizontally extending arm 17 rigidly mounted on its upper end. Pivotally connected at one end to the outer end of each arm 17 is a curved link 18, the other end of which is pivotally connected to oppositely disposed crank-arms 19 formed on and integral with the inner end of a tongue or sweep 20, which is pivoted on a stud 21 at a point midway between the pivotal connection of the links on the arms 19. The stud 21 is securely mounted on the beam A midway of its length and projects upward therefrom a sufficient distance to form a substantial bearing for the tongue 20 swiveled thereon. The tongue 20 normally extends in a horizontal direction parallel to and in alinement with the beam A, being of sufficient length to project a short distance beyond the end thereof, and having a loop on its outer end to receive the clevis pin of a whiffle-tree, not shown.

Means are provided for securing the tongue 20 in alinement with the beam A, which means is here shown as consisting of a dog 22 which is pivoted on the tongue and adapted to extend through a perforation in a lip formed on an abutment plate 23 on the beam A, the dog 22 being operated through a foot plate 24 thereon. Mounted on the tongue 20 is the driver's seat 30 which may be of any suitable description.

When the tongue 20 is parallel with the beam A as shown in Fig. 1, the disks 16 will be disposed at an angle to the beam in such position as to have a plowing action when the plow is drawn in the direction, indicated by the arrow X. By disconnecting the tongue 20 from the beam and swinging it on its pivot 21 one half a revolution, so as to dispose it in the position shown in Fig. 2, the arms 15 and disks 16 will swing beneath the beam A into an angular position in relation thereto opposite that shown in Fig. 1, in which position they will perform a plowing action when the plow is moved in the direction indicated by the arrow Y.

From the foregoing it will be seen that when the end of a furrow is reached, traveling in either direction, the plow is reversed by merely swinging the tongue from one end to the other, thus reversing the plow without disturbing the running gear or the plow beam.

As the outer disk receives the greatest strains on its front edge when plowing, tending to swing the arm 15 backward, means are provided for limiting the backward swing of the arm and also for relieving the arm 15 and stud 14 and its connections from a portion of the strains. This means resides in forming an upwardly projecting lug or shoulder 25 on the arm 15 which is adapted to contact and bear against an abutment 26 formed on the hanger 13, as shown in Fig. 3, when the arm 15 is swung into its outermost position.

When the third wheel or outrunner 3 is in its uppermost position, the disks 16 are in such a position as to cause approximately two-thirds of the lower portion of the disks to enter the ground. When it is desired to reverse the disks, the wheel 3 is lowered as before described, so as to elevate the plow beam A and thus lift the disks clear of the ground, this being also done when the plow is to be hauled from one place to another without plowing.

In constructing a plow on the foregoing principles which is to be particularly employed as a hillside plow, the alined wheels 2—2' are preferably mounted on steering knuckles, as shown in Fig. 6, in which case an arm 27 mounted on the knuckle in the usual manner is connected by a link 28 to an arm 29 on the link 17 adjacent the stud 14, so that when the tongue 20 is in a straight ahead position, the wheels 2—2' are thrown into an angular position in relation to the beam A as indicated in dotted lines in Fig. 6. The object of thus disposing the wheels 2—2' at an angle to the line of draft, is to cause them to have a climbing action when the plow is drawn across a sloping surface, as is common in machines of this character.

Having thus described my invention, what I claim and desire to secure by Letters Patent is—

1. In a disk plow, the combination with a draft-beam supported on a running gear, of horizontally swinging arms mounted thereon, rotatable dished disks on said arms, and means for operating said arms to dispose the disks in angular relation to the draft-beam, said means including a pivotally mounted tongue having arms extending in opposite direction from the pivotal center thereof and link connections between the outer ends of the arms and the corresponding ends of said swinging arms.

2. In a disk plow, the combination with a draft-beam supported on a running gear, of horizontally swinging arms mounted thereon, rotatable dished disks on said arms, a tongue pivotally mounted on the draft beam, and means connecting said tongue to said swinging arms whereby the latter may be operated to dispose the disks at an angle to the draft-beam by positioning said tongue, said means including rigid arms extending in opposite directions from the pivotal axis of the tongue, and links pivotally connecting the outer ends of said arms to the outer ends of the swinging arms.

3. In a disk plow, having a draft-beam and dished disks, means for swinging the disks from one side of the draft-beam to the other to reverse the plow, said means including a horizontally swinging tongue having arms extending to opposite sides of the pivotal center and link connections between said arms and the disks, said means operated through a tongue pivoted on the draft-beam.

4. In a disk plow having a draft-beam mounted on a running gear and dished disks on the draft-beam, means for swinging the disks from one side of the draft-beam to the other to reverse the plow, said means embodying horizontally swinging arms on which the disks are mounted, a tongue pivotally mounted on the draft-beam, and means connecting said tongue to said arms by which the arms are operated by swinging the tongue on its pivots, said means including rigid arms extending to opposite sides of the pivotal axis of the tongue, and links pivotally connecting the outer ends of said rigid arms to the outer ends of the swinging arms.

5. In a disk plow, the combination of a draft-beam, wheels mounted on each end thereof, horizontally swinging arms pivoted on the underside of the draft-beam, dished disks revolubly mounted on said arms, a tongue pivoted at its end on the upperside of the draft-beam and centrally thereof, said tongue adapted to be swung from one end of draft-beam to the other, and means connecting the inner end of the tongue to the swinging arms by which the disks may be swung from one side of the draft-beam to the other to reverse the plow, by swinging said tongue, said means including rigid arms extending to opposite sides of the pivotal axis of the tongue, and links pivotally connecting the outer ends of said rigid arms to the outer ends of the swinging arms.

6. In a disk plow, the combination of a draft-beam, wheels mounted on each end thereof, horizontally swinging arms pivoted on the underside of the draft-beam, dished disks revolubly mounted on said arms, a tongue pivoted at its end on the upperside of the draft-beam and centrally thereof, said tongue adapted to be swung from one end of draft-beam to the other, means connecting the inner end of the tongue to the swinging arms by which the disks may be swung from one side of the draft-beam to the other to reverse the plow, by swinging the tongue, said means including rigid arms extending in opposite directions from the pivotal axis of said tongue, and links pivotally connecting the outer ends of said arms, to the outer ends of the swinging arms, and means for limiting the swing of said tongue and means for attaching said tongue to said draft-beam.

7. In a disk plow, the combination of a draft-beam, wheels mounted on each end thereof, horizontally swinging arms pivoted on the underside of the draft-beam, dished disks revolubly mounted on said arms, a tongue pivoted at its end on the upperside of the draft-beam and centrally thereof, said tongue adapted to be swung from one end of draft-beam to the other, means connecting the inner end of the tongue to the swinging arms by which the disks may be swung from one side of the draft-beam to the other to reverse the plow, by swinging the tongue, means for limiting the swing of said tongue, means for attaching said tongue to said draft-beam, and means for limiting the movement of said arms in one direction.

8. In a disk plow, the combination of a draft-beam, wheels mounted on each end thereof, horizontally swinging arms pivoted on the underside of the draft-beam, dished disks revolubly mounted on said arms, a tongue pivoted at its end on the upperside of the draft-beam and centrally thereof, said tongue adapted to be swung from one end of draft-beam to the other, means connecting the inner end of the tongue to the swinging arms by which the disks may be swung from one side of the draft-beam to the other to reverse the plow by swinging the tongue, means for limiting the swing of said tongue, means for attaching said tongue to said draft-beam, means for limiting the movement of said arms in one direction, and means for raising or lowering said disks in relation to the ground, said means embodied in an adjustable outrunner.

9. In a disk plow, the combination of a draft-beam, wheels mounted on each end thereof, horizontally swinging arms pivoted on the underside of the draft-beam, dished disks revolubly mounted on said arms, a tongue pivoted at its end on the upperside of the draft-beam and centrally thereof, said tongue adapted to be swung from one of draft-beam to the other, means connecting the inner end of the tongue to the swinging arms by which the disks may be swung from one side of the draft-beam to the other to reverse the plow by swinging the tongue, means for limiting the swing of said tongue, means for attaching said tongue to said draft-beam, means for limiting the movement of said arms in one direction, means for raising and lowering said disks in relation to the ground, said means embodied in an adjustable outrunner, and means for adjusting said outrunner vertically from a hand lever mounted on the draft-beam.

In testimony whereof I have hereunto set my hand in the presence of two subscribing witnesses.

BARNET NIXON BOTTS.

Witnesses:
VERNON G. EXLINE,
E. F. EXLINE.

Copies of this patent may be obtained for five cents each, by addressing the "Commissioner of Patents, Washington, D. C."